United States Patent [19]

Meares et al.

[11] 4,174,465
[45] Nov. 13, 1979

[54] SIGNAL TRANSMITTING INTERFACE SYSTEM COMBINING TIME COMPRESSION AND MULTIPLEXING

[75] Inventors: Lawrence G. Meares, Rancho Palos Verdes; Robert D. Simpson, Huntington Beach, both of Calif.

[73] Assignee: McDonnell Douglas Corporation, Long Beach, Calif.

[21] Appl. No.: 820,372

[22] Filed: Jul. 29, 1977

[51] Int. Cl.² ............................................. H04J 3/02
[52] U.S. Cl. .............................. 179/15 A; 179/15 AC; 179/15 AF
[58] Field of Search ............... 179/15 A, 15 R, 15 AF, 179/15 AC; 340/183; 178/50; 364/200, 900

[56] References Cited

U.S. PATENT DOCUMENTS

| | | | |
|---|---|---|---|
| 3,872,257 | 3/1975 | Bleickardt et al. | 179/15 BS |
| 3,872,284 | 3/1975 | Seligman et al. | 364/200 |
| 3,995,120 | 11/1976 | Pachynski, Jr. | 179/15 AF |
| 4,034,404 | 7/1977 | Nakagome et al. | 179/15 R X |
| 4,049,917 | 9/1977 | Copperi et al. | 179/15 AP |

Primary Examiner—Thomas W. Brown
Attorney, Agent, or Firm—Henry M. Bissell

[57] ABSTRACT

Apparatus for transmitting particular output signals from a plurality of analog-to-digital converters to the guidance computer of an inertial navigation system. The number of channels of signals to be transmitted exceeds the number of available data lines. The A/D converter output is converted, according to its particular logic code, to a series of pulse counts which are thereafter multiplexed in a pulse combiner and applied to the data lines. During a first selected time interval, the pulses are accumulated for interleaving and transmission with the real time pulses in a second selected time interval. The multiplexing combines such interleaved pulses from one A/D converter output with those from another such output in alternate time intervals. Sync words are transmitted along with the data to permit the guidance computer software to demultiplex the data.

15 Claims, 4 Drawing Figures

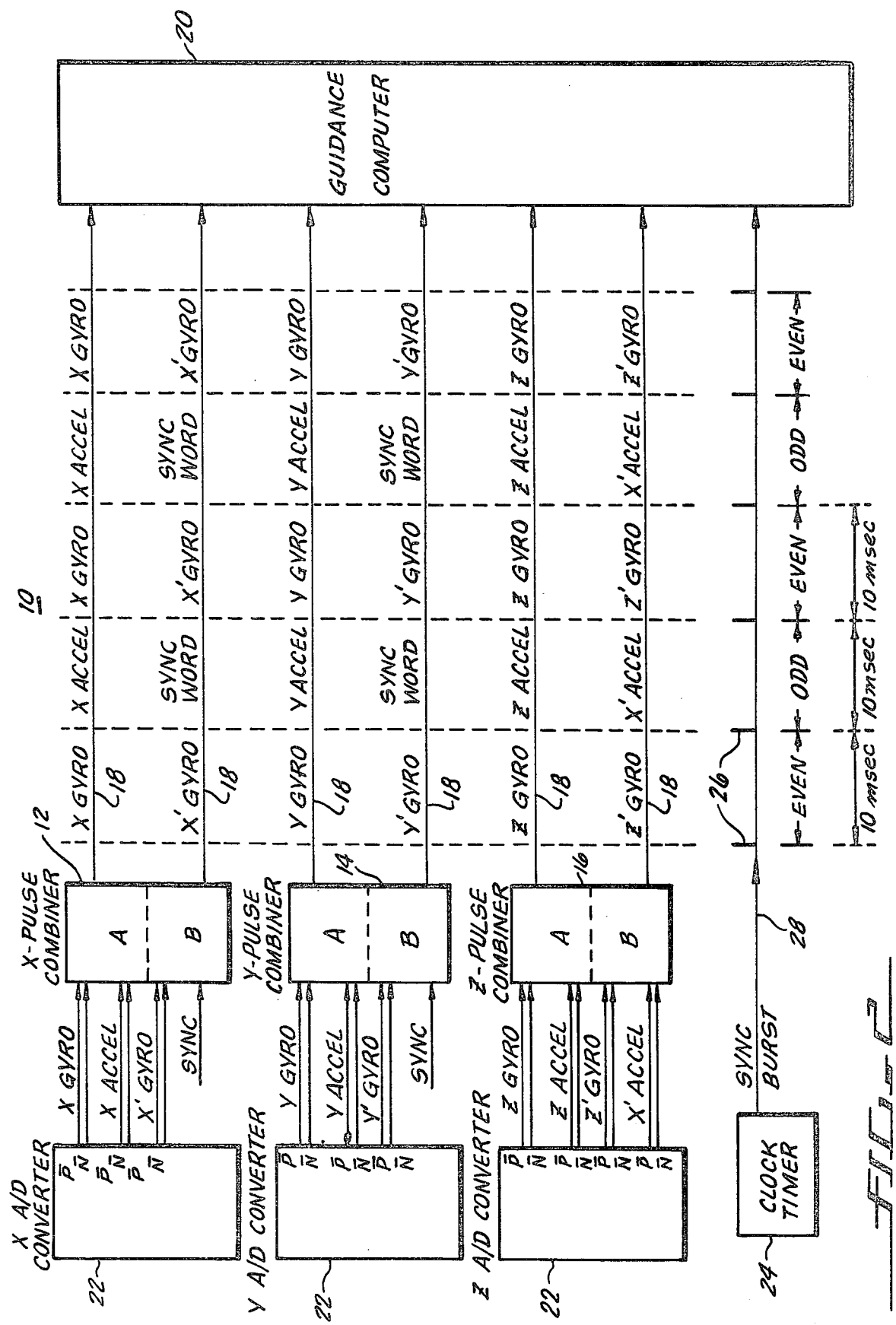

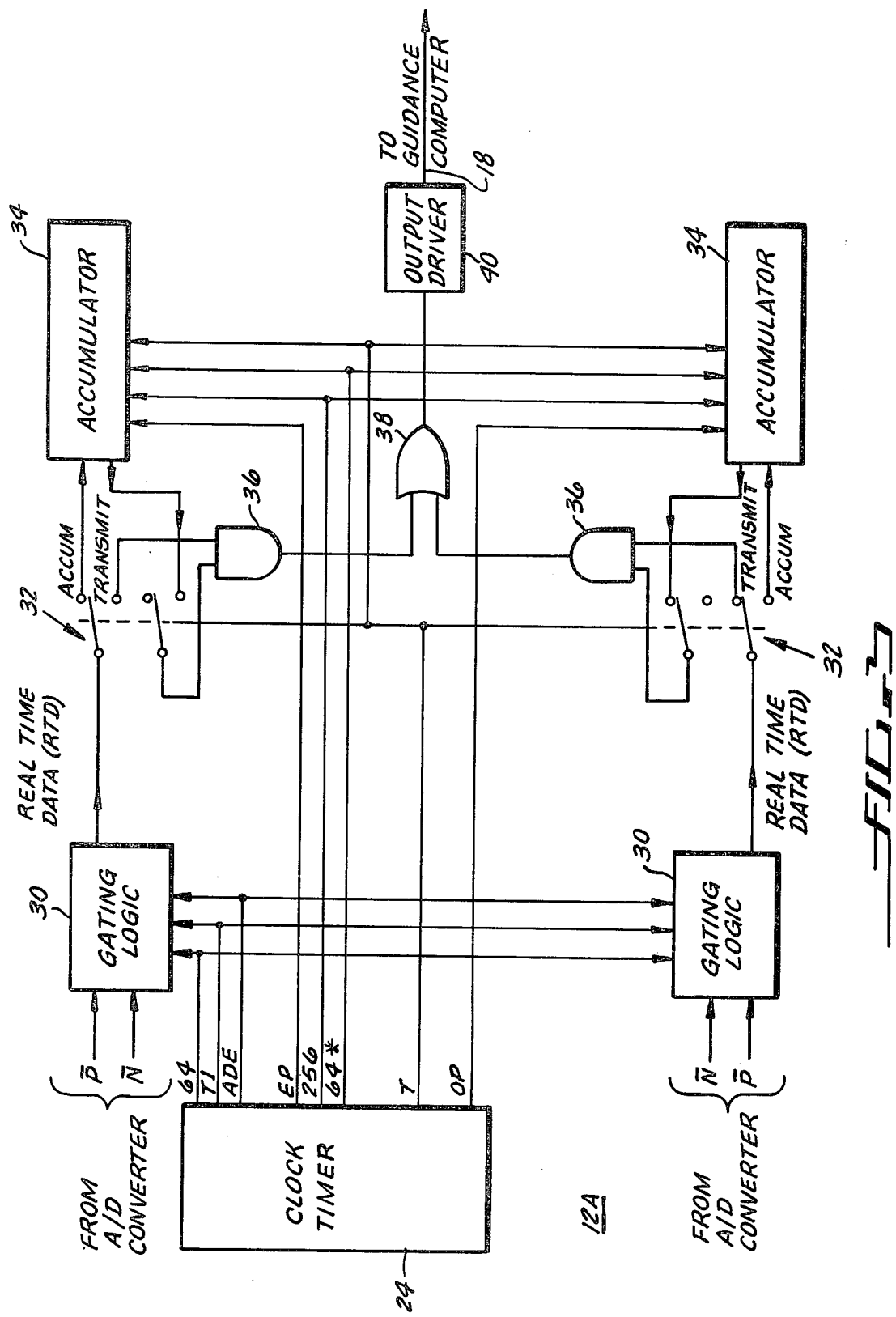

SIGNAL TRANSMITTING INTERFACE SYSTEM COMBINING TIME COMPRESSION AND MULTIPLEXING

BACKGROUND OF THE INVENTION

1. Field of the Invention

This invention relates to signal transmission apparatus, more particularly to an interface for transmitting pulse information between a number of A/D converters and a guidance computer for processing, wherein the number of converters exceeds the number of available data lines to the computer.

2. Description of the Prior Art

Interface systems, more commonly simply "interfaces", perform a specific role in transferring information between different points in a more general signal processing and signal responsive system. Interfaces may be used to perform such necessary functions as converting data from the output format of one signal generating device to another format that is acceptable to another interconnected device, reconciliation of timing differences, multiplexing, signal combining and separating, and the like. In general, interfaces are specifically designed to perform these particular functions for the system in which they are to operate. Thus, in many cases, the particular circuit configuration, characteristics and capabilities of an interface are unique in a given application, particularly where that application is itself a novel combination.

SUMMARY OF THE INVENTION

In brief, particular arrangements in accordance with the present invention have the capability of receiving the positive or negative outputs from ten different A/D converters and delivering the information contained therein on six data lines to an associated guidance computer. The output from a single A/D converter is provided on two lines, one with a pulse width proportional to a positive analog input voltage applied to the A/D converter, and the other with a pulse width proportional to a negative analog input voltage. The pulse width of the A/D converter output is in a multiples of 31.25 microseconds. The conversion of these A/D output pulse widths into pulse counts results in a range which extends from zero pulses to 1280 pulses over a 20 msec interval and corresponds to an A/D input range of from full scale negative to full scale positive. This relationship is the basis of conversion from A/D converter output pulse width to a string of pulses corresponding to that pulse width signal. Because of the disabling of the A/D converters during the guidance computer interrupt interval (sync burst), at which time the data lines must be inactive, and because of the A/D converter logic, the actual number of pulses generated over a 20 msec interval is as follows: 20 pulses for a full scale negative input voltage to the A/D converter, 1228 pulses for a full scale positive input voltage, and 624 pulses for a zero volt input.

The specific output signals on the two output lines of an A/D converter are converted to pulses for each 31.25 microsecond period in accordance with the following scheme: if the A/D negative output line is active, no pulses are generated during that 31.25 microsecond interval; if neither of the two output lines is active, a single pulse, designated a bias pulse, is generated at the beginning of the 31.25 microsecond interval; and if the positive line is active, two pulses, the bias pulse at the beginning of the 31.25 microsecond interval and another pulse called the positive pulse beginning at the midpoint of the 31.25 microsecond interval, are generated.

In the redundant inertial measurement system for which the present invention is designed, there are ten channels from the A/D converters, divided into three groups. The X A/D converter provides outputs for the X gyro, the X accelerometer, and the X' gyro. Similarly, the Y A/D converter provides output signals for the Y gyro, the Y accelerometer and the Y' gyro. The Z A/D converter has four output channels for the Z gyro, the Z accelerometer, the Z' gyro and the X' accelerometer. These signals are fed to three pulse combiners, one for each of the X, Y and Z converters. The input pulse counts to the pulse combiners are multiplexed and applied to the six data channels leading to the guidance computers. Two sync words, which always have no pulses in them, are also multiplexed with the A/D converter data and transmitted over two of the interface lines to the guidance computer to enable the guidance computer software to demultiplex the transmitted data. This multiplexing involves the accumulation of data pulses from one A/D converter and interleaving the real time data pulses and the accumulated data pulses, from the previous ten millisecond interval, of another A/D converter. A sync burst from the clock timer is also used to provide timing instructions to the guidance computer and is transmitted over a separate line.

BRIEF DESCRIPTION OF THE DRAWING

A better understanding of the present invention may be had from a consideration of the following detailed description, taken in conjunction with the accompanying drawing, in which:

FIG. 2 is a block diagram illustrating one particular arrangement of the present invention;

FIG. 3 is a block diagram of one particular portion of FIG. 2. and

DESCRIPTION OF THE PREFERRED EMBODIMENT

Figure 1:
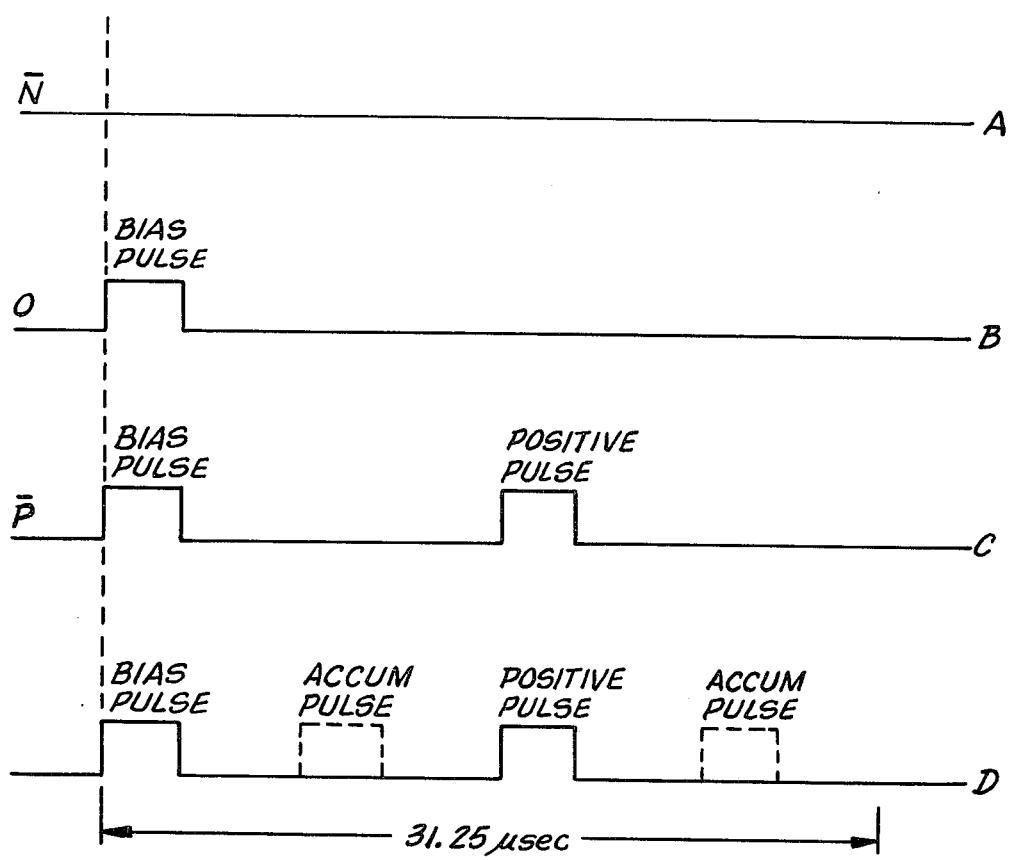
FIG. 1 is a diagram showing the time-multiplexed phase relationship of data pulses used in arrangements in accordance with the present invention.

FIG. 1 illustrates the pulse code into which the associated A/D converter output is transformed in accordance with the present invention for transmission to the associated guidance computer. The pulse width of the A/D converter output is in multiples of 31.25 microseconds. For each 31.25 microsecond interval, the output of the A/D converter is encoded as shown in FIG. 1. The A line at the top of FIG. 1 indicates the absence of pulses, corresponding to the presence of an output on the negative line $\overline{N}$ during that 31.25 microsecond interval. The B line of FIG. 1 shows a bias pulse at the beginning of the 31.25 microsecond interval, corresponding to the absence of an output on either the positive line $\overline{P}$ or the negative line $\overline{N}$. The C line of FIG. 1 indicates the code for the presence of an output on the positive line $\overline{P}$ from the associated A/D converter, represented by a bias pulse followed by a positive pulse halfway through the timing interval. As mentioned, the outputs on two A/D converters are combined by time-multiplexing for transmission over the data lines to the guidance computer. This is accomplished by accumulating the pulses from one A/D converter for a 10-millisecond interval while transmitting the accumulated pulses with real time pulses from a second A/D converter, the accumulated pulses being interleaved with the real time pulses as indicated in the D line of FIG. 1. Details of the apparatus for performing the encoding and multiplexing are shown in FIGS. 2 and 3.

In FIG. 2, an interface 10 in accordance with the present invention is represented in block diagram form. The interface 10 essentially comprises three pulse combiner stages: an X-pulse combiner 12, a Y-pulse combiner 14 and a Z-pulse combiner 16. Each of the pulse combiners 12, 14 and 16 is divided into similar halves A and B. Each half receives input signals from two distinct circuits, processes these inputs and applies the resultant combination signal to a single output data line 18, of which there are six, leading to an associated guidance computer 20. FIG. 2 also shows associated X, Y and Z A/D converters 22 for the sake of completeness, but these converters are not part of this invention. A clock timer 24 is also included for providing appropriate timing and synchronizing signals.

Referring to the X A/D converter 22 as an example for discussion with the X-pulse combiner 12, it will be understood that the X A/D converter is really a block of three separate converters providing information respectively indicative of signals from the X gyro, the X accelerometer, and the X' gyro employed as inertial navigation instruments in an associated inertial navigation system of the strap-down type. The digital information for a single such instrument is provided by a single associated A/D converter on two lines, $\bar{P}$ and $\bar{N}$, for indicating amplitude and polarity of the instrument output. After processing and combining by multiplexing of the signals from two A/D converters, such as in the A half of the X-pulse combiner 12, the output is a series of sequential even and odd 10 millisecond transmission intervals alternating between the two inputs to the A half of the X-pulse combiner 12. Thus, in the output line 18 from the X-pulse combiner 12A, it may be seen that the even intervals carry information from the X gyro and the odd intervals carry information from the X accelerometer. For the X-pulse combiner 12 and the Y-pulse combiner 14, each of which is coupled by only three A/D converters, the fourth input is a sync word which is applied on the second data line from the particular pulse combiner to designate the odd intervals. These sync words always have no pulses in them and are transmitted to enable the guidance control software to demultiplex the data. In the Z-pulse combiner 16 which is coupled to four A/D converters, the X' accelerometer being additional information for redundancy, the sync word is not employed, the desired redundancy for the sync word being achieved by duplication in the X- and Y-pulse combiners 12, 14.

A clock timer 24 provides a sync burst signal 26 every 10 milliseconds over the sync line 28 to the guidance computer 20. The sync burst is used to interrupt the guidance computer at the end of the 10 millisecond interval in order to instruct the computer that the 10 milliseconds of data is finished and to prepare for the next 10 milliseconds of data to be transmitted.

The circuit designated 12A, the block diagram of FIG. 3, represents one-half of a pulse combiner stage of FIG. 2, in this case, the A half of the X-pulse combiner 12, together with the clock timer 24. The circuit 12A is shown comprising a pair of gating logic circuits 30 coupled via electronic switches 32 to corresponding accumulators or counters 34. Steering gates 36 are coupled to the switches 32 and the outputs of the accumulators 34 and have their outputs connected to the input of a combining gate 38 coupled to an output driver 40 leading to a data line 18 to the guidance computer. It will be noted that the upper and lower portions of the circuit represented in FIG. 3 are entirely symmetrical insofar as the structure is concerned, although it may be noted that the two switches 32 are arranged to operate out of phase with each other.

With the switches 32 positioned as shown in FIG. 3, corresponding to a given 10 millisecond timing interval, real time data from the upper gating logic stage 30 is directed by a switch 32 to the accumulator 34. At the same time, real time data from the lower gating logic stage 30 is directed by the lower switch 32 to a transmit line via gates 36 and 38, and the lower switch 32 also directs the data previously accumulated in the lower accumulator 34 to the gate 36 for combination with the real time data. In the next 10 millisecond interval, the switches 32 reverse their states so that the pulses accumulated in the upper accumulator 34 are now transmitted along with the real time data from the upper gating logic stage 30 while the real time data in the lower path is directed to its accumulator 34.

Figure 4:
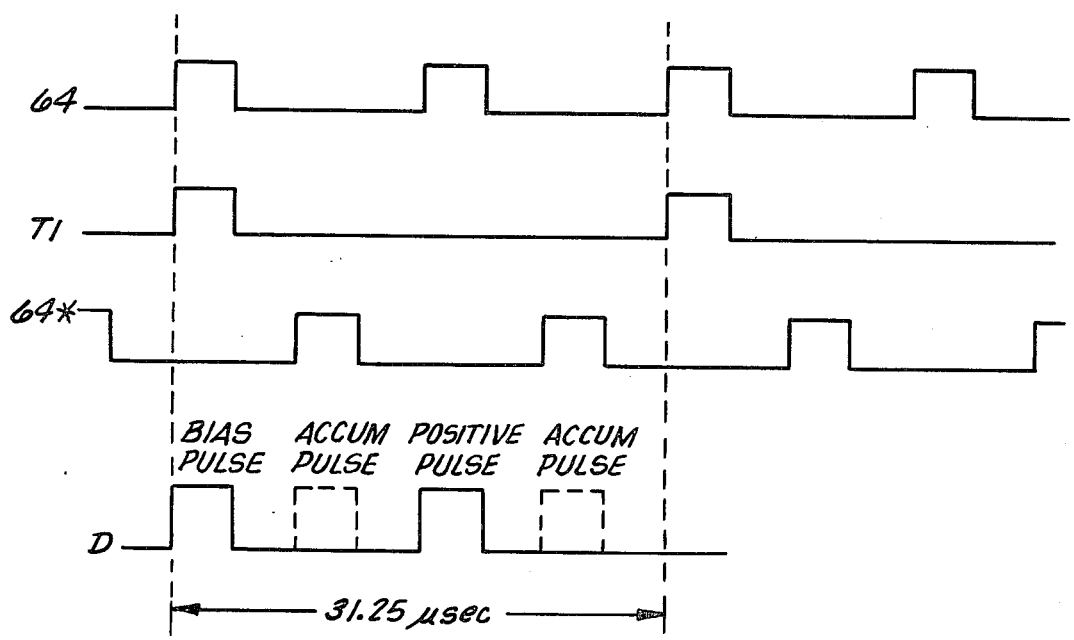
FIG. 4 is a diagram of waveforms showing gating control signals used in the arrangement of FIGS. 2 and 3.

The basic clock frequency provided by the clock timer 24 is 32 KHz. The clock timer 24 provides various timing and phasing signals for the pulse combiner 12A of FIG. 3. A transmit signal T is provided to control the switches 32, the control function being indicated symbolically by the broken lines through the switch arms. The signals 64, 64*, and T1 are shown in FIG. 4 along with the line D from FIG. 1 which shows a 31.25 microsecond period. The signals T1 and 64 are applied to the gating logic blocks 30 (FIG. 3) and, as can be seen from the relationship in FIG. 4, are used to generate the real time bias pulses and positive pulses. The signal 64* is applied to the accumulators 34 and, as can also be seen from FIG. 4, is used to generate the accumulated data pulses which are to be interleaved with the real time data pulses. The signals EP, OP and 256 are also applied to the accumulators 34. Signal 256 is a clocking signal for the counters in the accumulator 34 while EP and OP are signals used to preset the counters in the accumulator 34 to zero after the even and odd transmission intervals respectively. The enable signal ADE, which corresponds to a disabling of the A/D converter during the sync bursts at 10 millisecond intervals, is also applied to gating logic blocks 30 and is effective to render the data lines 18 inactive during the sync burst interval of approximately 250 microseconds. The gating logic blocks 30, the accumulators 34, the electronic switches 32, the steering gates 36 and the combining gate 38 are all conventional logic circuitry known in the art, and the details thereof are not part of this invention. The accumulator itself is simply an up-down pulse counter with the capability of generating output pulses in accordance with those counted.

When controlled by the signals from the clock timer 24 as described, a gating logic stage 30 operates to generate pulse signals each interval of 31.25 microseconds as real time data corresponding to the digital information received from the associated A/D converter in accordance with the transformation relationship described hereinabove in connection with FIG. 1. Thus, the real time data in a given 31.25 microsecond interval is the absence of pulses, the presence of a bias pulse at the beginning of an interval or the presence of a bias pulse at the beginning and a positive pulse at the middle of the interval, depending on whether the input from the associated A/D converter is a negative signal, the absence of negative and positive (equals zero) or a positive signal, respectively. Combination of the real time and accumulated pulses for a given A/D converter results in the interleaved signal D as shown in FIG. 1. Taking as an illustration the X-pulse combiner 12A of FIG. 2, during an even 10 millisecond interval, the data line 18 carries the real time and accumulated pulses representing 20 milliseconds of X gyro information. In the next, odd, 10 millisecond interval, the line carries interleaved real time and accumulated pulses representing 20 milliseconds of X accelerometer information. It then shifts back to the X gyro information and continues to alternate each 10 milliseconds between X gyro and X accelerometer information. In this fashion, the signals from 10 A/D converters plus multiplexing code information in the form of two separate sync words are transmitted to the guidance computer over the six available lines without loss or distortion of the data.

Although there have been described above specific arrangements of signal transmitting interface systems in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An interface system for receiving digital input signals in a first form and providing output signals in a second form corresponding to the information content of said first form comprising:
    pulse combining means coupled to receive input signals over a first plurality of lines and provide output signals corresponding to the input signals to a second plurality of output lines, the second plurality being fewer in number than the first plurality;
    means for converting the input signals on said first plurality of lines to signal pulses in accordance with a conversion code;
    means for accumulating a plurality of said pulses in a first channel as they are developed in real time during a first selected time interval while transmitting pulses from a second channel to a single output line of said second plurality;
    means for interleaving the accumulated pulses with the real time pulses in said first channel during a second time interval; and
    means for applying a string of said interleaved pulses from said first channel to said single output line during said second time interval.

2. The system of claim 1 further comprising means for intermittently accumulating pulses in a second channel as they are developed in real time during the second time interval; means for interleaving the accumulated pulses with the real time pulses in said second channel during the first time interval; and means for applying a string of said last-mentioned interleaved pulses from said second channel to the output line during the first time interval.

3. The system of claim 1 wherein the converting means acts to convert input signals to signal pulses in accordance with a conversion code wherein a first input signal condition is indicated by the absence of pulses, a second input signal condition is indicated by the presence of one signal pulse at the beginning of a time interval, and a third input signal condition is indicated by the presence of one signal pulse at the beginning and one signal pulse at the middle of the time interval.

4. The system of claim 3 wherein the string of interleaved pulses comprises, in a predetermined time interval, first and second pulses at the beginning and middle of the time interval and accumulated pulses interleaved between the first and second pulses.

5. An interface system comprising:
    a pair of input logic stages coupled to receive digital signals from respective first and second digital signal sources and develop respective strings of pulses corresponding to the associated signal source information on corresponding first and second output lines;
    first and second switching means and first and second accumulators intercoupled with said output lines; and
    means for controlling the switching means to alternatively apply pulses from one of said output lines to an associated one of the accumulators and apply pulses from said one output line to a transmission path interconnected by said switching means with an output of the associated accumulator.

6. An interface system comprising:
    gating means for receiving digital signals from a first source and generating a series of real time data pulses in accordance with a selected code;
    accumulating means adapted to accumulate a selected plurality of real time data pulses from said first source during a first time interval and transmit pulses corresponding to the accumulated pulses during a second time interval; and
    means for selectively interleaving the pulses from the accumulating means with a corresponding plurality of succeeding real time data pulses from said first source for transmission on an output line during the second time interval.

7. The system of claim 6 wherein the interleaving means comprise a steering gate and switching means connected to alternatively direct the real time data pulses to the accumulating means and to one input of the steering gate and to correspondingly open and close a path from the output of the accumulating means to a second input of the steering gate.

8. The system of claim 7 further including timing means coupled to the switching means for controlling the switching operation thereof.

9. The system of claim 8 in combination with additional, like, gating means, accumulating means and interleaving means wherein the respective gating means, accumulating means, and interleaving means comprise dual sets of means respectively connected in first and second identical data combining channels, the first channel being coupled to receive digital signals from said first source and the second channel being coupled to receive digital signals from a second source; wherein the timing means is coupled to control the switching means of both channels to operate in opposite phase with respect to each other so that interleaved pulses are directed through the steering gate of the first channel during a first time interval, while pulses are accumulated by the accumulating means of the second channel, and are directed through the steering gate of the second channel during a second time interval, while pulses are accumulated in the accumulating means of the first channel; and a combining gate coupled to the outputs of the steering gates of both channels for applying the signals alternately from the first channel during the first time interval and the second channel during the second time interval to a common output line.

10. The system of claim 9 further comprising additional sets of means corresponding to those of said first and second channels arranged in third and fourth channels identical to said first and second channels, the gating means of the third channel being coupled to a third digital signal source and an additional combining gate coupling the outputs of the third and fourth channels to a common second output line.

11. The system of claim 10 wherein the gating means of the fourth channel is coupled to receive a sync signal and to generate a sync word output for application to the second output line during alternate time intervals for distinguishing between the first and second time intervals.

12. The method of multiplexing discrete pulse signals appearing over a plurality of channels for application to a single transmission line comprising:

accumulating a selected plurality of signals in a first channel while transmitting pulse signals from a second channel over the transmission line during a first time interval; and interleaving the accumulated pulse signals with a corresponding plurality of real time signals in the first channel for transmission over the transmission line during the second time interval while accumulating pulse signals in the second channel for interleaving and transmission with second channel real time signals in a succeeding time interval.

13. The method of claim 12 further comprising the steps of switching a first channel real time signal line between an accumulator input and the transmission line at the transition between first and second time intervals and connecting the accumulator output to the transmission line when the real time signal line is also connected thereto.

14. The method of claim 12 further comprising interleaving the real time and accumulated signals of the second channel and transmitting the interleaved signals during alternate time intervals between transmissions of interleaved signals from the first channel.

15. The method of claim 14 further comprising transmitting interleaved real time and accumulated signals from third and fourth channels over a second transmission line in alternate time intervals and further including the step of transmitting in selected ones of said time intervals a signal for identifying said selected time intervals.

* * * * *